United States Patent [19]

Schirmer

[11] Patent Number: 5,230,293
[45] Date of Patent: Jul. 27, 1993

[54] METHOD AND APPARATUS FOR CONTROLLING A REFUSE INCINERATION PLANT

[75] Inventor: Alfons Schirmer, Zürich, Switzerland

[73] Assignee: Von Roll AG, Gerlafingen, Switzerland

[21] Appl. No.: 840,184

[22] Filed: Feb. 24, 1992

[30] Foreign Application Priority Data

Feb. 22, 1991 [CH] Switzerland ............ 00 550/91

[51] Int. Cl.⁵ .................................. F23G 5/00
[52] U.S. Cl. ........................ 110/346; 110/186; 110/234; 122/2; 236/14; 236/15 E
[58] Field of Search .......... 110/185, 186, 234, 346; 122/2, 449; 236/14, 15 E

[56] References Cited

U.S. PATENT DOCUMENTS

| | | | |
|---|---|---|---|
| 4,516,929 | 5/1985 | Hiroi et al. | 236/15 E |
| 4,838,183 | 6/1989 | Tsaveras et al. | 110/190 |
| 4,981,087 | 1/1991 | Martin | 110/186 |
| 5,052,310 | 10/1991 | Goff et al. | 110/234 |

FOREIGN PATENT DOCUMENTS 3215073  11/1982  Fed. Rep. of Germany .
520897   5/1972   Switzerland .
663999   12/1978  Switzerland .

OTHER PUBLICATIONS

VGB Kraftwerkstechnik, Bd. 67, Nr. 2, Feb., 1987, pp. 132–133 G. Schetter et al.
Stemens Review, vol. 49, No. 7, 1975, Erlangen De, pp. 498–502; Hilfsheimer Und Mettler: Automatische Regelung Des Verbrennersablaufs in Einer Mullverbrennungs Anlage.
Control Science and Technology for the Progress of Society, Aug. 24, 1982, IFAC; Pergamon Press; H. Akashi, Tokyo, Japan.

Primary Examiner—Edward G. Favors
Attorney, Agent, or Firm—Oblon, Spivak, McClelland, Maier & Neustadt

[57] ABSTRACT

A multi-loop control system and a method for using the control system to even out the generation of heat produced by a refuse incineration plant. The quantity of steam generated is controlled as a primary controlled variable and the oxygen content of the flue gas is controlled as a secondary controlled variable. This method makes it possible to improve other parameters in operating a refuse incineration plant.

11 Claims, 2 Drawing Sheets

5,230,293

METHOD AND APPARATUS FOR CONTROLLING A REFUSE INCINERATION PLANT

BACKGROUND OF THE INVENTION

1. Field of the Invention

The invention relates to a method of operating a refuse incineration plant having a combustion chamber containing a grate for receiving refuse and a boiler receiving hot flue gases for the combustion chamber.

2. Discussion of the Background

The operation and, in particular, the uniform generation of heat in oil-fired or coal-fired power stations does not present problems. It is achieved by means of uniformly introducing a quantity of fuel, whose quality is constant and known. In the case of refuse incineration plants, too, the main objective, apart from constant flue gas quality and quantity, is to keep the heat output constant. In the case of refuse or waste combustion plants, it is not possible to control the quantity of heat by means of the metered introduction alone since the composition and, consequently, the calorific value of the combustible material introduced varies considerably with time, from glass to paper to moist garden wastes. Accordingly, even the desire to keep the quantity of heat produced and, consequently, the steam constant presents problems. Even more problematic is the constant generation of heat while optimizing the other parameters, for example the flue gas quality.

According to a known method, an attempt is made to keep the generation of heat constant on the basis of measuring solely the quantity of steam. Such a procedure is unsatisfactory. In this method, value variations are obtained which have large amplitudes.

It is known that with a fairly large proportion of combustible material in refuse, more oxygen is required for the incineration in the combustion chamber. As a consequence, less oxygen is present in the flue gases. This fact has already been exploited by G. Schetter and E. Leitmeir. In VGB KRAFTWERKSTECHNIK 1987, page 132, 133, a firing control system is described in which the influencing variable refuse composition is reduced to such an extent that a comparatively uniform incineration process is guaranteed. For this purpose, the use of three mutually independent control circuits is proposed, the first two of which the authors have already tested and the third only existed as a work project. In control circuit 1, the refuse throughput was controlled on the basis of the oxygen content of the flue gas as a controlled variable. Control circuit 2 used the quantity of steam as controlled variable and acted on the primary air supply. The purpose of control circuit 3, which was in the development stage, would have been to incorporate the control of the secondary air into the system.

This known type of control is expensive and is not capable of guaranteeing the uniformity of the liberation of heat and, consequently, the quantity of steam to the extent desired in practice. Optimization of further parameters is not even considered.

SUMMARY OF THE INVENTION

Accordingly, one object of this invention is to provide a novel method of operating a refuse incineration plant which makes it possible, with an economically acceptable expenditure, to even out the heat generation and, therefore, to keep the quantity of steam constant and, moreover, also to optimize refuse incineration plants equipped with grates to meet requirements.

The invention also relates to a control system for carrying out the method according to the invention and also to a refuse incineration plant including the control system.

Multi-loop control systems or control circuits are known in the art. They are also referred to as cascade control. They involve at least a two-loop control circuit, one or more secondary loops being disposed in the main loop. The primary controller or steering controller used is a slowly operating PI controller which has rapidly operating P controllers downstream as secondary controllers or follower controllers. According to the invention, the quantity of steam produced is detected with a slight delay in the cascade control as the primary controlled variable. The secondary controlled variable used is the rapidly available value of the oxygen content in the flue gas. Since this variable is available virtually without delay, the manipulated variable can be acted on directly within the secondary loop of the cascade control. The ram, the grate and the primary air valve(s), i.e., the introduction of refuse into the incineration chamber, the refuse throughput through the furnace and the air supply for the incineration, are preferably controlled by the manipulated variables determined by the secondary controllers.

The method according to the invention achieves the evening-out, i.e., the maintenance of constancy, of the heat generation and, consequently, of the quantity of steam. In addition, other process parameters, for example flue gas quality, slag quality, service life of the grate and firing chamber temperature can be optimized. At the same time, a constant quantity and quality of flue gas is achieved.

Further suitable secondary controlled variables are the temperature of the furnace roof and the grate temperature, whose inclusion in additional secondary control circuits make it possible to refine the control process and, consequently, to eliminate small variations in the quantity of steam.

The measurement of the temperature at the furnace roof and at the grate results in further substantial advantages. This becomes clearly obvious if it is borne in mind that the process which takes place on the grate generally requires about one hour and that this process has hitherto been controlled by the operating staff purely on the basis of intuition. The invention therefore makes it possible for the first time to control the incineration process on the grate on the basis of the conditions actually prevailing. The individual advantages of including the temperature of the furnace roof and of the grate are: maximum utilization of the grate area, longer service life of the grate, better flue-gas burn-up rate, better flue-gas quality and more economical air excess.

If, for example, the temperature of the furnace roof is too high, the ram and, therefore, the refuse supply are slowed down. As a consequence, the degree of coverage of the grate is reduced, i.e., the grate is less well insulated; the grate temperature rises. As a consequence, the riddling rate is reduced in order to obtain a higher degree of coverage; at the same time, the quantity of primary air is also reduced and the quantity of secondary air correspondingly increased.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
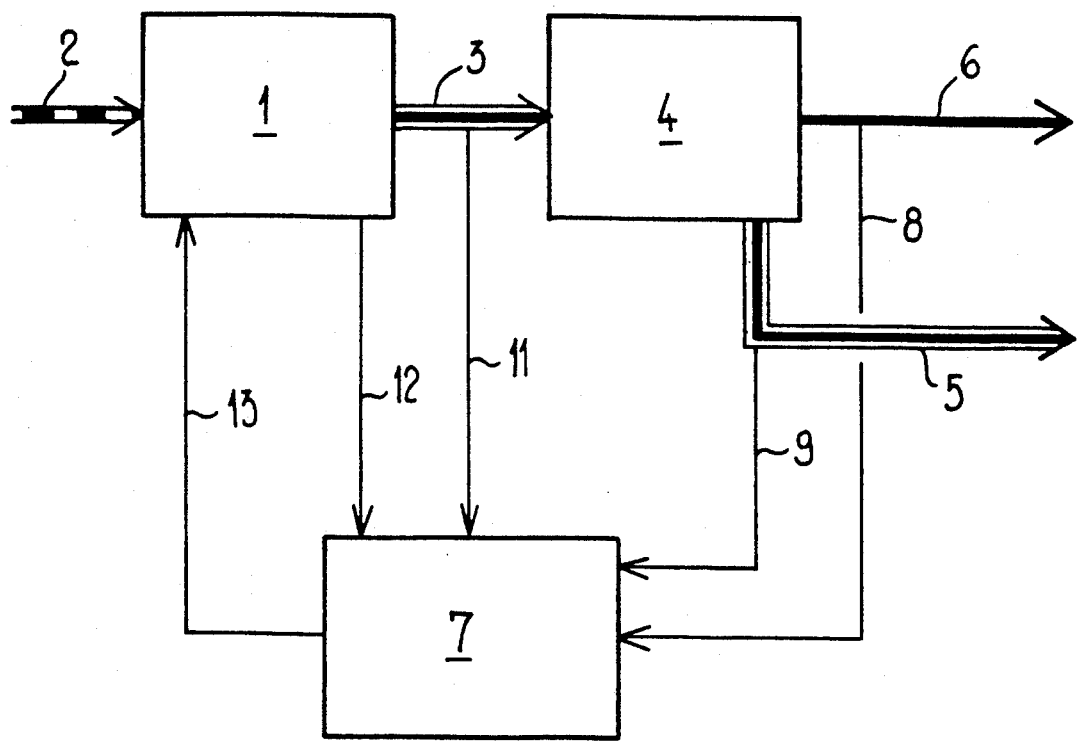
FIG. 1 shows purely diagrammatically a flow diagram of a refuse incineration plant.

Refuse incineration plants of the type discussed here are known. They are produced and marketed, inter alia, by the patent holder. Refuse is supplied by means of a ram 2 to the combustion chamber 1 in FIG. 1 which is not shown in detail. The metered supply is a function of the ram velocity. The refuse supplied is fed onto a driven incineration grate (not shown), where it is dried, degassed and incinerated. The incineration process is affected by the supply of primary air. The hot flue gases 3 are fed out of the combustion chamber 1 into a boiler 4, where they are used to generate steam. The cooled flue gases 5 and the steam 6 leave the boiler 4. The measured values for steam 8, oxygen content 9 of the flue gas and, optionally, temperature of the furnace roof 11 and of the grate 12 are supplied to a constant output or optimum output control system 7. The control system provides actuating signals 13 for the feed ram, the grate and the primary air valves.

Figure 2:
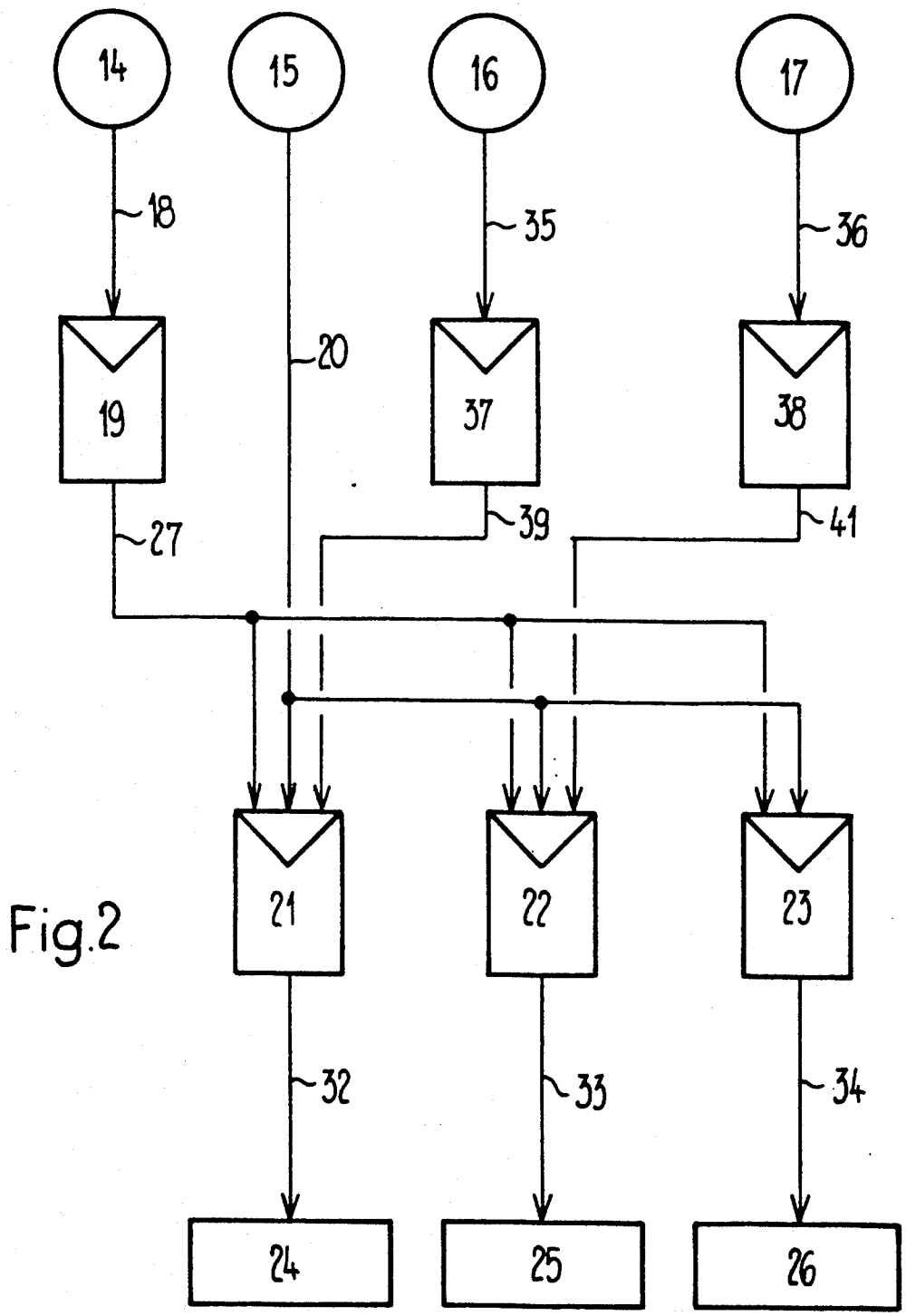
FIG. 2 shows purely diagrammatically a representation of an embodiment of the control system according to the invention.

The control system in FIG. 2 comprises known measurement devices 14, 15, 16, 17 for the quantity of steam, oxygen content of the flue gas, and temperature of the furnace roof and of the grate. The measured value for the quantity of steam is supplied to a primary controller or steering controller 19 as input signal 18. This is a slowly operating PI controller. Its output signal 27 is supplied to three downstream secondary or follower controllers 21, 22, 23. These are rapidly operating P controllers. The setpoint value of the secondary controllers 21, 22, 23 is adjusted by means of the output signal 27 of the primary controller on the basis of the measured steam values. The measured value for oxygen (O$_2$) in the flue gas is fed to the secondary controllers 21, 22, 23 as input signal 20. This is an immediate process since the oxygen is measured without delay. The outputs of each secondary controller 21, 22, 23 are connected to an actuator: ram 24 (metered refuse introduction), grate 25 (dwell time of refuse on the grate) and primary air valves 26 (supply of air for the incineration). The actuating signals 32, 33, 34 of the secondary controllers 21, 22, 23 are applied to the actuators 24, 25, 26 virtually without delay.

According to a particularly preferred embodiment of the invention, the temperature in the combustion chamber and/or the grate temperature are/is additionally measured using suitable measuring devices 16, 17. The measured value is supplied as input signal 35, 36 in each case to a further secondary controller 37, 38, whose output signals 39, 41 are applied to the secondary controllers 21, 22, 23. This guarantees that the liberation of heat in a refuse incineration plant is kept constant and optimized.

To improve the method further, the secondary controller 23 for primary air may be connected to the secondary air control. This makes it possible to control the quantity of secondary air in such a way that the sum of primary air and secondary air, i.e., the total quantity of combustion air, remains constant.

Obviously, numerous modifications and variations of the present invention are possible in light of the above teachings. It is therefore to be understood that within the scope of the appended claims, the invention may be practiced otherwise than as specifically described herein.

What is claimed is:

1. A method for operating a refuse incineration plant having a combustion chamber containing a grate for receiving refuse and a boiler for receiving hot flue gases from the combustion chamber, wherein the generation of heat is evened out by means of a single multi-loop control system, which comprises:
   initiating a fire in the combustion chamber;
   measuring a quantity of steam produced by said boiler;
   supplying a signal representing said quantity of steam as a primary controlled variable to a primary controller;
   measuring oxygen content in said hot flue gases; and
   supplying a signal representing said oxygen content as a secondary controlled variable to at least one secondary controller.

2. The method according to claim 1, wherein said at least one secondary controller includes:
   a first secondary controller for metering the introduction of refuse into the combustion chamber;
   a second secondary controller for regulating the dwell time of said refuse on said grate; and
   a third secondary controller for regulating a quantity of primary air supplied to said combustion chamber.

3. A method according to claim 1, further comprising the steps of:
   measuring a furnace roof temperature in said incinerator; and
   supplying a signal representing said furnace roof temperature to said at least one secondary controller.

4. A method according to claim 1, further comprising the steps of:
   measuring a temperature of said grate; and
   supplying a signal representing said grate temperature to said at least one secondary controller.

5. A method according to claim 1, which comprises keeping constant a total quantity of combustion air.

6. A single multi-loop control system for evening out a quantity of heat generated by a refuse incineration plant having a combustion chamber with a grate for receiving refuse and a boiler receiving hot gases from said combustion chamber, said control system comprising:
   a steam measuring device for measuring a quantity of steam produced in said boiler;
   a primary controller receiving a signal as a primary controlled variable representing said quantity of steam from said steam measuring device;
   a first secondary controller for receiving an output from said primary controller for regulating a rate of introduction of refuse to said combustion chamber;
   a second secondary controller for receiving an output from said primary controller for regulating throughput of refuse through said incinerator;
   a third secondary controller for receiving an output signal from said primary controller for regulating a supply of air to said combustion chamber; and an oxygen measuring device for measuring oxygen content of said flue gas, wherein said oxygen measuring device provides a signal as a secondary controlled variable representing said oxygen content to each of said first, second, and third secondary controllers.

7. The refuse incineration plant according to claim 6, wherein said primary controller is a slowly operating PI controller and said secondary controllers are more rapidly operating P controllers.

8. The refuse incineration plant according to claim 6, further comprising:
    at least one further secondary controller providing an output to said first, second, and third secondary controllers; and
    a furnace temperature measurement device for measuring a furnace roof temperature, said furnace temperature measurement device providing a signal representing said furnace roof temperature to said at least one further secondary controller.

9. The refuse incineration plant according to claim 6, further comprising:
    at least one further secondary controller providing an output to at least one of said first, second, and third secondary controllers; and
    a grate temperature measurement device for measuring the temperature of the grate, said grate temperature measurement device providing a signal representing said grate temperature to said at least one further secondary controller.

10. The refuse incineration plant according to claim 8, further comprising a grate temperature measurement device for measuring a grate temperature, wherein said at least one further secondary controller includes first and second further secondary controllers, wherein said first further secondary controller receives said signal representing said furnace roof temperature, and wherein said second further secondary controller receives a signal from said grate temperature measurement device representing said grate temperature.

11. A refuse incineration plant using a single multi-loop control system, comprising:
    a combustion chamber;
    a grate located in said combustion chamber for receiving refuse thereon;
    a ram for metering a quantity of refuse introduced into said combustion chamber;
    a primary air valve for regulating a supply of air to said combustion chamber;
    a boiler receiving hot flue gases from said combustion chamber;
    a steam measuring device for measuring a quantity of steam produced in said boiler;
    a primary controller receiving a signal as a primary controlled variable representing said quantity of steam from said steam measuring device;
    a first secondary controller for receiving an output from said primary controller to actuate said ram;
    a second secondary controller for receiving an output from said primary controller to regulate refuse throughput;
    a third secondary controller for receiving an output signal from said primary controller to regulate air provided through said primary air valve; and
    an oxygen measuring device for measuring oxygen content of said flue gas, wherein said oxygen measuring device provides a signal as a secondary controlled variable representing said oxygen content to each of said first, second, and third secondary controllers.

* * * * *